United States Patent
Haydont et al.

(10) Patent No.: US 12,467,089 B2
(45) Date of Patent: *Nov. 11, 2025

(54) MOLECULAR SIGNATURES OF THREE SUB-POPULATIONS OF DERMAL FIBROBLASTS AND DERMAL EQUIVALENT COMPRISING ONE OF THESE SUB-POPULATIONS

(71) Applicant: L'OREAL, Paris (FR)

(72) Inventors: Valérie Haydont, Aulnay-sous-Bois (FR); Daniel Asselineau, Aulnay-sous-Bois (FR)

(73) Assignee: L'OREAL, Paris (FR)

( * ) Notice: Subject to any disclaimer, the term of this patent is extended or adjusted under 35 U.S.C. 154(b) by 738 days.

This patent is subject to a terminal disclaimer.

(21) Appl. No.: 16/650,258

(22) PCT Filed: Sep. 27, 2018

(86) PCT No.: PCT/EP2018/076347
§ 371 (c)(1),
(2) Date: Mar. 24, 2020

(87) PCT Pub. No.: WO2019/063731
PCT Pub. Date: Apr. 4, 2019

(65) Prior Publication Data
US 2021/0371925 A1    Dec. 2, 2021

(30) Foreign Application Priority Data
Sep. 28, 2017   (FR) ....................... 1759026

(51) Int. Cl.
*C12Q 1/6881*    (2018.01)
*C12N 5/077*    (2010.01)

(52) U.S. Cl.
CPC .......... *C12Q 1/6881* (2013.01); *C12N 5/0656* (2013.01); *C12Q 2600/158* (2013.01)

(58) Field of Classification Search
None
See application file for complete search history.

(56) References Cited

FOREIGN PATENT DOCUMENTS

| WO | WO 2013/076240 | * | 5/2013 |
| WO | WO2013/076240 A1 | | 5/2013 |

OTHER PUBLICATIONS

Chan (G&P magazine 2006 vol. 6 No. 3 pp. 20-26).*
Nauroy (Journal of Investigative Dermatology (2017) 137 pp. 1787-1789).*
Heymer et al., "Cell Analysis—Isolation of Keratinocytes and Fibroblasts from Human Foreskin by One-step Enzyme Incubation Using Liberase Research Grade Products", Biochemica, vol. 2, Jan. 1, 2009.
Janson et al., "Different Gene Expression Patterns in Human Papillary and Reticular Fibroblasts", Journal of Investigative Dermatology (Nov. 1, 2012) 132, 2565-2572.
Janson et al., "Papillary fibroblasts differentiate into reticular fibroblasts after prolonged in vitro culture", Experimental Dermatology (2013) vol. 22, 48-53.
Nauroy et al., "Human Dermal Fibroblast Subpopulations Display Distinct Gene Signatures Related to Cell Behaviors and Matrisome", Journal of Investigative Dermatology (Aug. 8, 2017) 137, 1787-1789.
Nauroy et al., "Human Dermal Fibroblast Subpopulations Display Distinct Gene Signatures Related to Cell Behaviors and Matrisome—Supplementary Materials and Methods", Journal of Investigative Dermatology (Apr. 17, 2017).
Anonymous, "Technical Note—Design and Performance of the GeneChip® Human Genome U133 Plus 2.0 and Human Genome U133A 2.0 Arrays", retrieved from the internet: URL:http://tools.thermofisher.com/content/sfs/brochures/hgu133_p2_technote.pdf [retrieved on Jun. 14, 2017].
Affymetrix; Technical Note; "Design and Performance of the GeneChip Human GenomeU133 Plus 2.0 and Human Genome U133A 2.0 Arrays," RNA Arrays and Reagents, pp. 1-9.
P. Nauroy et al.; "Human Dermal Fibroblast Subpopulations Display Distinct Gene Signatures Related to Cell Behaviors and Matrisome," Journal of Investigative Dermatology, vol. 137, 2017, pp. 1787-1789.
Amy C. Maher et al.; "Sex Differences in Global mRNA Content of Human Skeletal Muscle," PLOS ONE, vol. 4, issue 7, Jul. 2009, p. e6335.
Anatoly Mikhailik et al.; "Notch ligand-dependent gene expression in human endometrial stromal cells," Biochemical and Biophysical Research Communications, vol. 388, 2009, pp. 479-482.

* cited by examiner

*Primary Examiner* — Amanda Haney
(74) *Attorney, Agent, or Firm* — POLSINELLI PC

(57) ABSTRACT

The object of this invention is a method of in vitro identification of a dermal fibroblast as being a papillary fibroblast, a reticular fibroblast or a dermal-hypodermal junction fibroblast (FJDH), comprising a step of measuring the level of an expression product of at least one gene selected from the group consisting in the UCP2 and FGF9, and optionally the COL11 A1 and ACAN genes, and the level of an expression product of the KLF9 gene.

12 Claims, No Drawings

MOLECULAR SIGNATURES OF THREE SUB-POPULATIONS OF DERMAL FIBROBLASTS AND DERMAL EQUIVALENT COMPRISING ONE OF THESE SUB-POPULATIONS

CROSS REFERENCE TO RELATED APPLICATIONS

This application is a National Phase filing under 35 U.S.C. § 371 of PCT/EP2018/076347 filed on 27 Sep. 2018; which application in turn claims priority to Application No. 1759026 filed in France on 28 Sep. 2017. The entire contents of each application are hereby incorporated by reference.

This invention relates to the identification of sub-populations of dermal fibroblasts.

Skin is composed of two related compartments, namely the epidermis and the dermis.

The epidermis is mostly composed of three cell types, namely keratinocytes, themselves majority among epidermis cells, melanocytes and Langerhans cells. These cells form a keratinized epithelium that differentiates into superposed layers above which there is a layer of dead cells forming the stratum corneum.

The dermis provides a solid support for the epidermis. It also supplies nourishment for it. It is composed mainly of fibroblasts and an extracellular matrix.

The dermis more precisely contains two distinct layers: the papillary surface layer (300-400 µm, that is in contact with the epidermis) and the subjacent reticular layer (that extends as far as the hypodermis). Conjunctive trabecula of the dermis that can also extend into the hypodermis.

The papillary dermis is characterized by a relatively thin extracellular matrix with a high cell density, while the reticular dermis has a very dense network of matrix fibers and a low cell density. Constituents of the matrix are also different in the two layers.

Furthermore, when the fibroblasts of these distinct layers, called papillary fibroblasts and reticular fibroblasts respectively, are cultivated, they have distinct morphological characteristics. For example, the reticular fibroblasts have an extended and more square appearance, while papillary fibroblasts generally have a thin fusiform morphology. Furthermore, differences in proliferation, culture matrix production, response to growth factors and production of growth factors are observed between these two cell sub-populations.

Thus, in normal skin, the dermis is composed of at least two sub-populations of fibroblasts, which necessarily has essential consequences on the skin itself.

In the field of skin equivalents (or in vitro reconstructed skins), it is essential to reproduce the characteristics and properties of the different constituents of normal skin as precisely as possible in order to reflect the reactions of normal skin as faithfully as possible.

Having seen differences in properties between the sub-populations of dermal fibroblasts, it is important that an in vitro skin equivalent comprises clearly identified sub-populations of dermal fibroblasts using biomarkers.

This invention meets this need.

Janson et al. (2012) *Journal of Investigative Dermatology* 132:2565-2572 performed a transcriptome study to identify molecular signatures of papillary and reticular phenotypes. They identified the MGP protein as being exclusively expressed in the reticular dermis, while the PDPN and NTN1 genes present a generally higher expression in papillary fibroblasts.

Nauroy et al. (2017) *Journal of Investigative Dermatology* identified, from skin samples from young donors only, some differentially expressed markers in reticular fibroblasts that are not present in papillary fibroblasts. For example, the COL11A1, MGP, FGF18, COMP and ACAN genes have been identified as being overexpressed in reticular fibroblasts.

However, these articles only consider papillary and reticular fibroblasts. However, the present inventors have demonstrated that another sub-population of fibroblasts, called dermal-hypodermal junction fibroblasts, could be isolated at conjunctive trabecula emitted by the dermis into the hypodermis.

The inventors have also identified molecular signatures, involving a small number of biomarkers, so that the three sub-populations of dermal fibroblasts can be identified and distinguished: papillary fibroblasts, reticular fibroblasts and dermal-hypodermal junction fibroblasts.

Apart from isolating the sub-population of dermal-hypodermal junction fibroblasts for the first time, these inventors have indeed demonstrated that papillary, reticular and dermal-hypodermal junction fibroblasts could be identified by measuring the expression level of at least one gene selected from the UCP2 and FGF9 genes and optionally the COL11A1 and ACAN genes, and optionally the expression level of the KLF9 gene.

Indeed, the expression level of the UCP2 gene is significantly higher in papillary fibroblasts than in reticular fibroblasts and dermal-hypodermal junction fibroblasts while expression levels of the COL11A1, ACAN and FGF9 genes are significantly higher in reticular fibroblasts and dermal-hypodermal junction fibroblasts than in papillary fibroblasts. Finally, the expression level of the KLF9 gene is significantly higher in dermal-hypodermal junction fibroblasts than in reticular fibroblasts.

The present invention thus relates to an in vitro method of identification of a dermal fibroblast as being a papillary fibroblast, a reticular fibroblast or a dermal-hypodermal junction fibroblast (FJDH), comprising the following steps:
 a) providing a biological sample comprising at least one dermal fibroblast,
 b) measuring the level of an expression product of at least one gene selected from the group consisting in UCP2 and FGF9 genes and optionally COL11A1 and ACAN genes, and optionally the level of an expression product of the KLF9 gene, and
 c) based on the level(s) measured in step b), identifying the dermal fibroblast as being a papillary fibroblast, a reticular fibroblast or a dermal-hypodermal junction fibroblast (FJDH).

Another object of this invention is the use of an expression product of at least one gene selected from the group consisting in the UCP2 and FGF9 genes and optionally the COL11A1 and ACAN genes, optionally in combination with an expression product of the KLF9 gene, as marker to identify a dermal fibroblast in vitro as being a papillary fibroblast, a reticular fibroblast or a dermal-hypodermal junction fibroblast (FJDH).

Another object of the invention relates to an in vitro dermal equivalent comprising a sub-population of dermal-hypodermal junction fibroblasts (FJDH).

The present invention also relates to an in vitro skin equivalent comprising a dermal equivalent according to the invention.

The present invention also relates to a kit to identify a dermal fibroblast as being a papillary fibroblast, a reticular fibroblast or a dermal-hypodermal junction fibroblast (FJDH), said kit comprising:

at least one measurement means selected from the group consisting in a means of measuring the level of a UCP2 gene expression product, a means of measuring the level of an FGF9 gene expression product, a means of measuring the level of a COL11A1 gene expression product and a means of measuring the level of an ACAN gene expression product and at least one means of measuring the level of a KLF9 gene expression product.

Another object of the invention relates to a DNA microarray to identify a dermal fibroblast as being a papillary fibroblast, a reticular fibroblast or a dermal-hypodermal junction fibroblast (FJDH), said microarray comprising:

at least one probe selected from the group consisting in a probe detecting a UCP2 gene expression product, a probe detecting a FGF9 gene expression product, a probe detecting a COL11A1 gene expression product, and a probe detecting an ACAN gene expression product and at least one probe detecting a KLF9 gene expression product.

DETAILED DESCRIPTION OF THE INVENTION

Fibroblasts

In this description, "dermal fibroblasts" refers to fibroblasts originating from the dermis.

In this description, "papillary fibroblast" refers to a fibroblast of the papillary dermis, the papillary dermis being characterized by a relatively thin extracellular matrix and a high cell density. Papillary fibroblasts in culture typically have a thin fusiform morphology.

In this description, "reticular fibroblast" refers to a fibroblast of the reticular dermis, the reticular dermis being characterized by a relatively dense lattice of matrix fibers and a low cell density. Reticular fibroblasts in culture typically have an extended and more square appearance.

In this description, "dermal-hypodermal junction fibroblast" or "FJDH fibroblast" means a fibroblast from the zone located at the same level as the conjunctive trabecula emitted by the dermis into the hypodermis. FJDH fibroblasts in culture typically have a very heterogeneous morphology. Thus, a very wide variety of shapes can be observed in the cell carpet, varying from very small tricuspid cells to very large multipole cells with a strongly marked intracell trabecular network (visible in optical microscopy).

Identification Method

Step (a) in the identification method according to the invention includes providing a biological sample comprising at least one dermal fibroblast, as defined in the "Fibroblasts" section above.

In particular, the biological sample may be an in vitro culture of dermal fibroblasts or a mixture of dermal fibroblasts, a sample originating from a skin biopsy, or a sample originating from an in vitro dermis or skin equivalent.

In particular, the sample can originate from a human skin biopsy performed on young subjects, such as subjects being between 15 and 40 years old, preferably being between 17 and 31 years old.

Step b) in the identification method according to the invention comprises the measurement of the level of an expression product of at least one gene selected from the group consisting in UCP2 and FGF9 genes and optionally COL11A1 and ACAN genes, and optionally the level of an expression product of the KLF9 gene.

In this description, "UCP2 gene", means the coding gene for "mitochondrial uncoupling protein 2". The UCP2 gene is also called the SLC25A8 gene and the UCP2 protein is also called UCPH or "solute carrier family 25 member 8". It belongs to the family of mitochondrial anionic support proteins (MACP) and controls reactive oxygen species derived from mitochondria. It is typically described in Pecqueur et al. (1999) *Biochemical and Biophysical Research Communications* 255:40-46. The human UCP2 protein sequence is typically referenced as UniProt number P55851.

In this description, "ACAN gene", means the coding gene for "aggrecan core protein". The ACAN gene is also called the AGC1, CSPG1 and MSK16 gene and the ACAN protein is also called "aggrecan" or "cartilage-specific proteoglycan core protein" or CSPCP or "chondroitin sulfate proteoglycan core protein 1" or "chondroitin sulfate proteoglycan 1". It forms part of the extracellular matrix in the cartilage tissue. It is a proteoglycan. It is typically described in Doege et al. (1991) *J. Biol. Chem.* 15:894-902. The human ACAN protein sequence is typically referenced as UniProt number P16112.

In this description, "FGF9 gene" means a gene coding the fibroblast growth factor 9. The FGF9 protein is also called "Glia-activating factor" or GAF or "heparin-binding growth factor g" or HBGF-9. It has a growth stimulating effect on glial cells in culture. It is typically described in Miyamoto et al. (1993) *Molecular and Cellular Biology* 13:4251-4259. The human FGF9 protein sequence is typically referenced as UniProt number P31371.

In this description "COL11A1 gene", means the gene coding the al (XI) chain of collagen. The COL11A1 gene is also called the COLL6 gene. This chain is one of two alpha chains of type XI collagen, a minor fibrillar collagen. It is typically described in Yoshioka et al. (1990) *J. Biol. Chem.* 15:6423-6426. The human COL11A1 protein sequence is typically referenced as UniProt number P12107.

In this description, "KLF9 gene" refers to a gene coding the Krueppel-like factor 9. The KLF9 gene is also called the BTEB gene or the BTEB1 gene and the KLF9 protein is also called the BTEB1 transcription factor or the GC-box-binding protein 1 or basic transcription element-binding protein 1 or BTE protein 1 ("BTE-binding protein 1"). It forms part of the family of type Sp1 C2H2 zinc finger transcription factors. It is typically described in Spörl et al. (2012) *Proc. Natl. Acad. Science* USA 109:10903-10908. The human KLF9 protein sequence is typically referenced as UniProt number Q13886.

In the context of the invention, the UniProt references cited above are those that were available on Jul. 31, 2017.

In one particular embodiment, step (b) comprises the measurement of the level of an expression product of at least two genes selected from the group consisting in the UCP2 and FGF9 genes, and optionally the level of an expression product of the KLF9 gene, preferably at least one gene selected from the group consisting in the UCP2 and FGF9 genes and at least one gene chosen from the group consisting in the ACAN and COL11A1 genes, and optionally the level of an expression product of the KLF9 gene, preferably at least 3 genes selected from the group consisting in the UCP2, ACAN, FGF9 and COL11A1 genes, and optionally the level of an expression product of the KLF9 gene, and even more preferably at least four genes selected from the group consisting in the UCP2, ACAN, FGF9 and COL11A1 genes, and optionally the level of an expression product of the KLF9 gene.

In one particular embodiment, step (b) comprises the measurement of the level of an expression product of at least one gene, particularly at least 2 genes, selected from the group consisting in the UCP2 and FGF9 genes. In another particular embodiment, step (b) comprises the measurement of the level of an expression product of at least one gene selected from the group consisting in the UCP2 and FGF9 genes and at least one gene selected from the group consisting in the COL11A1 and ACAN genes. In another particular embodiment, step (b) comprises the measurement of the level of an expression product of at least 3 genes, particularly at least 4 genes, selected from the group consisting in the UCP2, ACAN, FGF9 and COL11A1 genes.

In another particular embodiment, step (b) comprises the measurement of the level of an expression product of at least one gene, particularly at least 2 genes, 3 genes or 4 genes, selected from the group consisting in the UCP2, ACAN, FGF9 and COL11A1 genes, and the measurement of the level of an expression product of the KLF9 gene.

In this description, the term "expression product of the X gene" means the mRNA coded by said X gene or the protein coded by said X gene. The level of the expression product of the X gene can therefore be measured by quantifying the mRNA or the corresponding protein. In one particular embodiment, said expression product of the X gene is the mRNA coded by said X gene.

Preferably, the level of the expression product corresponds to the concentration or the quantity of the expression product.

The level of the expression product of an X gene can be measured in step (b) by any technique known to the skilled person. In particular, when the expression product is a protein, the level of the expression product can be measured by immunological assays such as ELISA assays, immunofluorescence assays (IFA), radioimmunoassays (RIA), competitive binding tests or Western Blot tests. When the expression product is an mRNA, the level of the expression product can be measured by RT-PCR, qRT-PCR, ddPCR (Droplet Digital PCR), by sequencing, for example by NGS (*Next generation sequencing*) type sequencing or by ddSEQ™ single cell isolator type sequencing.

The level of the expression product of the X gene in the tested sample is said to be increased when the ratio [expression level of the X gene in the tested sample/control level of the X gene] is greater than or equal to 2.

The level of the expression product of the X gene in the tested sample is said to be decreased when the ratio [control level of the X gene/expression level of the X gene in the tested sample] is greater than or equal to 2.

When the ratio [control level of the X gene/expression level of the X gene in the tested sample] is greater than or equal to 2, a (−) symbol is appended before the obtained value.

This ratio is conventionally called "fold change".

Step c) in the identification method according to the invention comprises identification of the dermal fibroblast as being a papillary fibroblast, a reticular fibroblast or a dermal-hypodermal junction fibroblast (FJDH), based on the level(s) measured in step (b).

In one particular embodiment of the invention, step (c) in the identification method according to the invention comprises a comparison of the level(s) measured in step b) with one or more control levels.

In this description, "control level" means a reference value preferably corresponding to the level of said expression product of said gene in a dermal fibroblast known as being a papillary, reticular or FJDH fibroblast, and in particular originating from the same donor.

In this description, "dermal fibroblast known as being a papillary, reticular or FJDH fibroblast" means a dermal fibroblast with a type (papillary, reticular or FJDH) that has previously been determined considering its morphology, its source or detected biomarkers.

Dermal fibroblasts known as being papillary dermal fibroblasts can be isolated from a non-defatted human skin, notably on a tissue dermatomed at 300 μm, then deepidermized after dispase action (Roche—2.4 U/mL) for 16 h at 4° C.

Dermal fibroblasts known as being reticular dermal fibroblasts can be isolated from a non-defatted human skin from the tissue portion depleted from its dermal-hyopdermal junction; the tissue is then dermatomed at 700 μm. Only the lower part of the tissue is kept.

Dermal fibroblasts known as being FJDH dermal fibroblasts can be collected from conjunctive trabecula which are present at the dermal-hypodermal junction. Those can be collected using a clamp and scissors.

In one particular embodiment, the level of an expression product of at least one gene selected from the group consisting in the UCP2 and FGF9 genes is preferably measured in step b), and
the dermal fibroblast is identified as being a papillary fibroblast when:
  (i) the level of the expression product of the UCP2 gene is higher than a control level, and/or
  (ii) the level of the expression product of the FGF9 gene is lower than a control level,
the control levels in (i) and (ii) preferably being the levels of the expression product of the UCP2 and FGF9 genes respectively in a dermal fibroblast known as being a reticular fibroblast or an FJDH fibroblast.

In another particular embodiment, the level of an expression product of at least one gene selected from the group consisting in the UCP2 and FGF9 genes and at least one gene selected from the group consisting in the COL11A1 and ACAN genes, are preferably measured in step b), and the dermal fibroblast is identified as being a papillary fibroblast when:
  1) (i) the level of the expression product of the UCP2 gene is higher than a control level, and/or
     (ii) the level of the expression product of the FGF9 gene is lower than a control level,
  and
  2) (ii) the expression level of the expression product of the COL11A1 gene is lower than a control level, and/or
     (iv) the level of the expression product of the ACAN gene is lower than a control level, and/or
the control levels in (i), (ii), (iii) and (iv) preferably being the levels of the expression product of the UCP2, FGF9, COL11A1 and ACAN genes in a dermal fibroblast known as being a reticular fibroblast or an FJDH fibroblast.

In another particular embodiment, the level of an expression product of at least one gene selected from the group consisting in the UCP2, ACAN, FGF9 and COL11A1 genes, and the level of an expression product of the KLF9 gene are preferably measured in step b), and the dermal fibroblast is identified as being a reticular fibroblast when:
1) (i) the level of the expression product of the UCP2 gene is lower than a control level,
   (ii) the level of the expression product of the ACAN gene is higher than a control level,
   (iii) the level of the expression product of the FGF9 gene is higher than a control level, and/or
   (iv) the level of the expression product of the COL11A1 gene is higher than a control level,
and
2) the level of the expression product of the KLF9 gene is lower than a control level,
the control levels in 1(i), 1(ii), 1(iii) and 1(iv) preferably being the levels of the expression product of the UCP2, ACAN, FGF9 and COL11A1 genes respectively in a dermal fibroblast known as being a papillary fibroblast and the control level of 2) preferably being the level of the expression product of the KLF9 gene in a dermal fibroblast known as being an FJDH fibroblast.

In another particular embodiment, the level of an expression product of at least one gene selected from the group consisting in the UCP2, ACAN, FGF9 and COL11A1 genes and the level of an expression product of the KLF9 gene are preferably measured in step b), and the dermal fibroblast is identified as being a dermal-hypodermal junction fibroblast when:
1) (i) the level of the expression product of the UCP2 gene is lower than a control level,
   (ii) the level of the expression product of the ACAN gene is higher than a control level,
   (iii) the level of the expression product of the FGF9 gene is higher than a control level, and/or
   (iv) the level of the expression product of the COL11A1 gene is higher than a control level,
and
2) the level of the expression product of the KLF9 gene is higher than a control level,
the control levels in 1(i), 1(ii), 1(iii) and 1(iv) preferably being the levels of the expression product of the UCP2, ACAN, FGF9 and COL11A1 genes respectively in a dermal fibroblast known as being a papillary fibroblast and the control level of 2) preferably being the level of the expression product of the KLF9 gene in a dermal fibroblast known as being an reticular fibroblast.

In this description "higher level", means a level statistically significantly higher than the control level. Preferably the higher level is at least 1.5 times, at least 2 times at least 2.06 times, at least 2.5 times, at least 3 times, at least 3.2 times, at least 3.5 times, at least 4 times, at least 4.2 times, at least 4.28 times, at least 4.5 times, at least 5 times, at least 5.5 times, at least 5.8 times, at least 5.83 times, at least 10 times, at least 15 times, at least 20 times, at least 25 times, at least 28 times, at least 28.5 times or at least 28.6 times higher than the control level as defined above.

In this description "lower level", means a level statistically significantly lower than the control. Preferably the reduced level is at least 1.5 times, at least 2 times at least 2.06 times, at least 2.5 times, at least 3 times, at least 3.2 times, at least 3.5 times, at least 4 times, at least 4.2 times, at least 4.28 times, at least 4.5 times, at least 5 times, at least 5.5 times, at least 5.8 times, at least 5.83 times, at least 10 times, at least 15 times, at least 20 times, at least 25 times, at least 28 times, at least 28.5 times or at least 28.6 times lower than the control level as defined above.

Preferably, the dermal fibroblast is identified as being a papillary fibroblast when:
(i) the level of the expression product of the UCP2 gene is at least 5 times higher, and particularly at least 5.5 times, at least 5.8 times or at least 5.83 times higher than a control level as defined above, particularly with reference to the level of the expression product of the UCP2 gene in a dermal fibroblast known as being a reticular fibroblast, and/or
(ii) the level of the expression product of the FGF9 gene is at least 4 times lower, and particularly at least 4.2 times or at least 4.28 times lower than a control level as defined above, particularly with reference to the level of the expression product of the FGF9 gene in a dermal fibroblast known as being a reticular fibroblast.

Also preferably, the dermal fibroblast is identified as being a papillary fibroblast when:
1) (i) the level of the expression product of the UCP2 gene is at least 5 times higher, and particular at least 5.5 times, at least 5.8 times or at least 5.83 times higher than a control level as defined above, particularly with reference to the level of the expression product of the UCP2 gene in a dermal fibroblast known as being a reticular fibroblast, and/or
   (ii) the level of the expression product of the FGF9 gene is at least 4 times lower, and particularly at least 4.2 times or at least 4.28 times lower than a control level as defined above, particularly with reference to the level of the expression product of the FGF9 gene in a dermal fibroblast known as being a reticular fibroblast.
and
2) (iii) the level of the expression product of the COL11A1 gene is at least 25 times lower, and particularly at least 28 times, at least 28.5 times or at least 28.6 times lower than a control level as defined above, particularly with reference to the level of the expression product of the COL11A1 gene in a dermal fibroblast known as being a reticular fibroblast, and/or
   (iv) the level of the expression product of the ACAN gene is at least 3 times lower, and particularly at least 3.2 times lower than a control level as defined above, particularly with reference to the level of the expression product of the ACAN gene in a dermal fibroblast known as being a reticular fibroblast.

Preferably, the dermal fibroblast is identified as being a reticular fibroblast or an FJDH fibroblast when:
1) (i) the level of the expression product of the UCP2 gene is at least 5 times lower, and particular at least 5.5, at least 5.8 times or at least 5.83 times lower than a control level as defined above, particularly with reference to the level of the expression product of the UCP2 gene in a dermal fibroblast known as being a papillary fibroblast,
   (ii) the level of the expression product of the ACAN gene is at least 3 times higher, and particularly at least 3.2 times higher than a control level as defined above, particularly with reference to the level of the expression product of the ACAN gene in a dermal fibroblast known as being a papillary fibroblast.
   (iii) the level of the expression product of the FGF9 gene is at least 4 times higher, and particularly at least 4.2 times or at least 4.28 times higher than a control level as defined above, particularly with reference to the level of the expression product of the FGF9 gene in a dermal fibroblast known as being a papillary fibroblast, and/or.
   (iv) the level of the expression product of the COL11A1 gene is at least 25 times higher, and particular at least 28 times, at least 28.5 times or at least 28.6 times higher than a control level as defined above, particularly with reference to the level of the expression product of the COL11A1 gene in a dermal fibroblast known as being a papillary fibroblast, Preferably, the dermal fibroblast is identified as being an FJDH fibroblast when in addition:
2) the level of the expression product of the KLF9 gene is at least 2 times higher, and particularly at least 2.06 times higher than a control level as defined above, particularly with reference to the level of the expression product of the KLF9 gene in a dermal fibroblast known as being a reticular fibroblast.

Preferably, the dermal fibroblast is identified as being a reticular fibroblast when in addition:
2) the level of the expression product of the KLF9 gene is at least 2 times lower, and particularly at least 2.06 times lower than a control level as defined above, particularly with reference to the level of the expression product of the KLF9 gene in a dermal fibroblast known as being an FJDH fibroblast.

Kit and Microarray

Another object of the present invention is a kit to identify a dermal fibroblast as being a papillary fibroblast, a reticular fibroblast or a dermal-hypodermal junction fibroblast (FJDH), said kit comprising:
at least one measurement means selected from the group consisting in a means of measuring the level of a UCP2 gene expression product, a means of measuring the level of an FGF9 gene expression product, a means of measuring the level of a COL11A1 gene expression product and a means of measuring the level of an ACAN gene expression product,
at least one means of measuring the level of a KLF9 gene expression product, and
a control or several controls from which the control level can be obtained.

In particular, the kit may also comprise antibodies recognizing proteins coded by said genes in a biological sample as defined above, as separate components. The kit may include primers and/or probes specifically hybridizing to mRNA coded by said genes, as separate components.

The kit may also comprise additional optional components to implement the identification method according to the invention. Such optional components include for example containers, mixers, buffers, instructions to implement the method, markers or supports.

Another object of the present invention is a DNA microarray to identify a dermal fibroblast as being a papillary fibroblast, a reticular fibroblast or a dermal-hypodermal junction fibroblast (FJDH), said microarray consisting in:
at least one probe selected from the group consisting in a probe detecting a UCP2 gene expression product, a probe detecting an FGF9 gene expression product, a probe detecting a COL11A1 gene expression product, and a probe detecting an ACAN gene expression product
and
at least one probe detecting a KLF9 gene expression product.

The DNA microarray according to the invention does not comprise any probes detecting expression products of genes other than UCP2, FGF9, COL11A1, ACAN and KLF9.

In this description, "DNA microarray" refers to an ordered arrangement of at least two probes on a substrate. Preferably, the DNA microarray according to the invention also comprises a control or standard probe.

In this description, "probe" means an oligonucleotide or polynucleotide, RNA or DNA, that exists naturally as in a purified digestion product of a restriction enzyme or that is produced synthetically and that can be hybridized specifically with a polynucleotide carrying a sequence complementary to the sequence of the probe. The probe can be single strand or double strand. Preferably, the probe comprises or consists of 10 to 100 nucleotides, preferably 15 to 50 nucleotides or 15 to 25 nucleotides.

Dermis and Skin Equivalents

The inventors have identified a sub-population of dermal fibroblasts, for the first time: the fibroblasts of the dermal-hypodermal junction.

Therefore the use of these new fibroblasts in dermal equivalents can mime a normal dermis more precisely.

Therefore another object of the present invention is an in vitro dermis comprising a sub-population of dermal-hypodermal junction fibroblasts (FJDH), as defined in the "Fibroblasts" section above, for which:
1) (i) the level of the expression product of the UCP2 gene is decreased compared to a control level,
(ii) the level of the expression product of the ACAN gene is increased compared to a control level,
(iii) the level of the expression product of the FGF9 gene is increased compared to a control level, and/or
(iv) the level of the expression product of the COL11A1 gene is increased compared to a control level,
and
2) the level of the expression product of the KLF9 gene is increased compared to a control level.

The dermal equivalent according to the invention also comprises a sub-population of papillary fibroblasts and/or a sub-population of reticular fibroblasts, as defined in the "Fibroblasts" section above.

The dermal equivalent according to the invention preferably also comprises collagen.

The collagen in the dermal equivalent according to the invention can be any type of collagen and of any origin. Preferably, the collagen is selected from amongst the type I, III or V fibrillar collagens. Preferably, the collagen is of type I. Preferably, the collagen is of animal origin, in particular of bovine origin. Particularly preferably, the collagen is bovine type I collagen. Alternatively, the collagen can be a mixture of different types of collage, in any proportions and/or of various origins.

The fibroblasts in the dermal equivalent according to the invention can be of any origin, though they are preferably human fibroblasts.

Fibroblasts present in the dermal equivalent according to the invention preferably originate from a culture of fibroblasts, part of which was used to implement the identification method according to the invention, thus enabling identification of the entire culture as a culture being a culture of papillary, reticular or FJDH fibroblasts.

The dermal equivalent according to the invention can also comprise any other component that can be constitutively present in skin, such as endothelial cells, macrophages, monocytes, macrophage precursors, dendritic cell precursors or nerve cells.

The present invention also relates to a method of preparation of a dermal equivalent as defined above comprising an initial step of identifying dermal fibroblasts as being FJDH fibroblasts, comprising the following steps:
A) providing a homogeneous culture of dermal fibroblasts, B) sampling a part of the dermal fibroblasts culture provided in step A), C) identifying the part of the dermal fibroblasts culture sampled in step B) as being a culture of FJDH fibroblasts making use of the identification method as defined in the "Identification method" section defined above, and D) using the part of the dermal fibroblasts culture not sampled in step B) to prepare a dermal equivalent.

Any technique well known to the skilled person can be used to prepare the dermal equivalent in step D).

Preparation of the dermal equivalent in step D) can thus include a step to prepare a lattice containing collagen and a cellular suspension of FJDH fibroblasts, and possibly a cellular suspension of papillary and/or reticular fibroblasts.

As previously mentioned, the collagen used can be any type of collagen, from any origin, either alone or mixed.

Preferably, the lattice comprises fibroblasts at a concentration of $11\times10^5$ to $5\times10^6$ cells/ml, preferably at a concentration of $2\times10^5$ to $2\times10^6$ cells/ml.

The lattice can be prepared by any technique well known to those skilled in the art.

In particular, a solution comprising collagen and dermal fibroblasts can be prepared and deposited on a support.

Preferably, the solution is incubated so that the collagen can gel, for example for 10 to 30 min, then maintained in incubation to enable contraction of the lattice.

Preferably, the lattice is thus maintained in incubation for a further 1 to 7 days, and even more preferably for 3 or 4 days.

Since the dermal content has an influence on the epidermal compartment, the dermal equivalent according to the invention can act as a support for the formation of a skin equivalent.

The present invention thus also relates to an in vitro skin equivalent comprising a dermal equivalent as defined above.

The skin equivalent according to the invention comprises, on top of the dermal equivalent, an epidermal equivalent comprising at least keratinocytes.

The keratinocytes can be obtained from any source, but are preferably human keratinocytes. They can be prepared by any method well-known to persons skilled in the art. Thus, the keratinocytes can be prepared by culturing dissociated epidermis from normal skin samples, or by culturing keratinocytes obtained from the sheath of a hair follicle.

Preferably the keratinocytes are normal human skin keratinocytes.

Even more preferably, the keratinocytes are prepared from dissociated human epidermis obtained from a normal skin sample collected according to the method described in Régnier et al., Frontier of Matrix Biology, Vol. 9, 4-35 (Karger, Basel, 1981).

The epidermal equivalent can comprise any other cell type, such as Langerhans cells and/or Langerhans cell precursors and/or melanocytes.

Moreover, the epidermal equivalent may advantageously comprise melanocytes and/or Langerhans cells and/or Langerhans cell precursors.

The melanocytes can be isolated from any organ containing them, such as normal skin or hair follicles. Preferentially, the melanocytes are isolated from normal skin. Any method well-known to persons skilled in the art may be used, such as the method described in Olsson et al. (1994) *Acta. Derm. Venereol.* 74:226-268.

The Langerhans cells and/or Langerhans cell precursors can be as described in European patent application EP 789074.

The present invention also relates to a method for preparing a skin equivalent as defined above, including a dermal equivalent preparation step using the dermal equivalent preparation process as defined above.

Preferably, the skin equivalent preparation process comprises, after the dermal equivalent preparation step, a step involving the reconstitution of an epidermal equivalent, comprising at least keratinocytes, on the dermal equivalent.

This epidermal reconstitution step can be performed by any technique well-known to persons skilled in the art, such as the techniques described in patent applications EP 285471, EP285474, EP789074, EP502172, EP418035, WO91/16010, EP197090, EP20753, FR2665175 and FR2689904, or that described in Asselineau et al. (1985) *Exp. Cell. Res.* 159:536-539, in Asselineau et al. (1987), Models in dermato., col III, Ed. Lowe&Mailbach, 1-7 or in Asselineau et al. (1984) *Br J Dermatol.* 111 Suppl 27:219-22.

This reconstitution step can be advantageously preceded by a bonding step, performed in a culture dish, of the prepared dermal equivalent, for example using a bonding solution consisting of MEM 1.76× medium, FCS, NaOH 0.1N and MEM 25 mM Hepes 10% FCS.

Preferably, the reconstitution step is implemented by seeding keratinocytes onto the dermal equivalent, preferably in a seeding loop.

After seeding keratinocytes onto the dermal equivalent, the culture can advantageously be held submerged in nutrient medium, which may for example be the medium described by Rheinwald and Green (1975) *Cell* 6:317-330, medium which enables keratinocyte proliferation.

Following an incubation period, preferably of 3 to 15 days, even more preferably of 7 to 9 days, the skin equivalent is preferably maintained at the air/liquid interface, for example by depositing it onto a metal mesh. This liquid then preferably consists of the same nutrient medium as previously.

Incubation is then continued, preferably until a skin equivalent displaying the characteristics of a skin is obtained, i.e. a dermal equivalent covered by an epidermal equivalent displaying the four standard types of cell layers, i.e. the stratum basale, stratum suprabasale, stratum granulosum and stratum corneum.

In this way, incubation is preferably continued for a duration of between 5 and 30 days, even more preferably between 7 and 10 days.

Uses

The present invention also relates to the use of a dermal equivalent as defined in the "Dermal and skin equivalent" section above, or of a skin equivalent as defined in the "Dermal and skin equivalent" section above, to study skin functions.

The present invention also relates to a method of screening a compound displaying a cosmetic activity after topical application on the skin, particularly in the field of anti-aging, such as for the treatment of wrinkles and lines and/or in the field of inflammation and/or in the field of pigmentation, such as for example for the treatment of pigmentation spots, said screening process comprising the application of a candidate compound onto the dermal equivalent according to the invention, or onto the skin equivalent according to the invention.

Throughout the application, the term "comprising a" or "including a" means "comprising at least one" or "including at least one", in other words "comprising one or more" or "including one or more", unless specified otherwise.

Throughout the above description, unless specified otherwise, the term "between x and y" or "ranging from x to y" refers to an inclusive range, i.e. the values x and y are included in the range.

This invention will be illustrated in more detail by the example hereinbelow.

Example

The following example shows the isolation of the new sub-population of dermal-hypodermal junction fibroblasts by the inventors and identification of molecular signatures for sub-populations of fibroblasts existing in the dermis.

Material and Methods
Preparation of Cells

Papillary fibroblasts (Fp), reticular fibroblasts (Fr) and dermal-hypodermal junction fibroblasts (FJDH) were isolated from non-defatted human skin. These samples are collected after mammary reduction for esthetic reasons. Six women were included.

FJDH are isolated from conjunctive trabecula present at the dermal-hypodermal junction. The latter are sampled using a clamp and scissors.

Fr isolation is made on the part of tissue so depleted of its dermal-hypodermal junction. The tissue is then dermatomed at 700 µm. Only the lower part of the tissue is kept.

Fp isolation is made on tissue dermatomed at 300 µm and then de-epidermized after dispase action (Roche—2.4 Units/ml) during 16 h at 4° C.

After dilaceration, dermis fragments are digested under the action of type II collagenase at 0.2% (Gibco), at 37° C.

Cells are then amplified in MEM medium—10% fetal calf serum supplemented with Glutamine, sodium pyruvate, non-essential amino acids, penicillin, streptomycin and fungizone, under moist atmosphere, at 37° C. and 5% $CO_2$.

Transcriptome Analysis and RT-qPCR

After expansion of cells (population doubled between 7 and 10 times), mRNAs are extracted on QIAgen column following instructions given by the supplier.

Samples were divided by 2: one part was set aside for the transcriptome analysis, the other part was used to validate biomarkers by PCR.

The transcriptome analysis was made using the Affymetrix GeneChip HG-U133 Plus 2.0 type microarray. Probe sets considered as being differentially expressed had a fold change >2 for an unadjusted p-value <0.05.

Primers used for validations by RT-qPCR are commercially available from Qiagen (QIAgen—Quantitech Primer Assay) and are listed in table 1 below.

TABLE 1

Primers used

| Gene | QIAgen reference of the primer |
|---|---|
| ACAN | QT00001365 |
| COL11A1 | QT00088711 |
| FGF9 | QT00000091 |
| UCP2 | QT00014140 |
| GAPDH | QT01192646 |

Reconstructed Skins

Reconstructed skins were prepared using the protocol described in Asselineau et al. (1985) *Exp. Cell. Res.* 159: 536-539.

In short, $10^6$ fibroblasts from the dermal-hypodermal junction (FJDH) were included in a type I bovine collagen solution (Symatese). After 4 days of organization and contraction of the lattice, $5 \times 10^4$ keratinocytes are seeded at the lattice surface. The culture is maintained in immersion for 1 week in an MEM medium, 10% fetal calf serum, EGF (10 ng/ml), Hydrocortisone (0.4 µg/ml) and Cholera toxin (0.1 nM). Complete stratification of the epidermis is obtained one week after emersion.

Throughout the reconstruction process, the culture is continued in an incubator saturated in humidity containing 5% $CO_2$ at 37° C.

Results

Three sub-populations of fibroblasts were thus isolated and characterized within the dermis: papillary fibroblasts (close to the epidermis), reticular fibroblasts (more deeply implanted in the skin) and dermal-hypodermal junction fibroblasts (new cell sub-population isolated from conjunctive trabecula that the dermis emits into the hypodermis).

Cells of these 3 sub-populations were isolated and cultivated from breast plastic surgery collected on 6 individuals.

Transcriptome analyses of these 3 sub-populations were made and a differential expression of 5 specific genes was demonstrated between these 3 sub-populations with validation by RT-qPCR analysis.

The results of the RT-qPCR analysis are summarized in table 2 hereinbelow.

TABLE 2

RT-qPCR analysis of the 3 sub-populations of dermal fibroblasts

| | Fp vs Fr (fold change) RNA | Conclusion |
|---|---|---|
| ACAN | −3.2 | Regulated upwards in Fr |
| COL11A1 | −28.6 | |
| FGF9 | −4.28 | |
| UCP2 | 5.83 | Regulated upwards in Fp |

| | FR vs FJDH (fold change) RNA | Conclusion |
|---|---|---|
| KLF9 | −2.06 | Regulated upwards in FJDH |

Fp: papillary fibroblast, Fr: reticular fibroblast, FJDH: dermal-hypodermal junction fibroblasts.

The inventors have thus been able to demonstrate the following molecular signatures for the 3 fibroblast sub-populations identified in the dermis:

| | UCP2 | COL11A1 | ACAN | FGF9 | KLF9 |
|---|---|---|---|---|---|
| Papillary fibroblast | Positive = Increased | Weak = Decreased | Weak = Decreased | Weak = Decreased | — |
| Reticular fibroblast | Negative = Decreased | Positive = Increased | Positive = Increased | Positive = Increased | Weak = Decreased |
| FJDH fibroblast | Negative = Decreased | Positive = Increased | Positive = Increased | Positive = Increased | Positive = Increased |

A reconstituted skin comprising these 3 sub-populations was then obtained as indicated above.

The invention claimed is:

1. A method of preparing a dermal equivalent comprising a sub-population of dermal-hypodermal junction fibroblasts (FJDH) comprising:
   (a) providing a biological sample comprising dermal fibroblasts;
   (b) sampling a first portion of the biological sample provided in step (a);

(c) measuring the level of COL11A1, UCP2, and KLF9 in the first portion;

(d) determining that the first portion comprises FJDH when (i) the level of COL11A1 is higher than the level of COL11A1 in a reference sample of papillary fibroblasts, (ii) the level of UCP2 is lower than the level of UCP2 in a reference sample of papillary fibroblasts, and (iii) the level of KLF9 is higher than the level of KLF9 in a reference sample of reticular fibroblasts; and (e) using a unsampled portion of the biological sample provided in step (a) to prepare a dermal equivalent comprising a sub-population of FJDH.

2. The method of preparing a dermal equivalent according to claim 1, wherein the level of the expression product of the gene in the tested sample is said to be increased when the ratio expression levels of the gene in the tested sample/reference sample is greater than or equal to 2, or the level of the expression product of the gene in the tested sample is said to be decreased when the ratio of the expression levels of the gene in the reference sample/tested sample is greater than or equal to 2.

3. The method according to claim 1, further comprising measuring the level of ACAN and/or FGF9 in at least one portion of the biological sample provided in step (a).

4. A method of preparing a dermal equivalent comprising a sub-population of dermal-hypodermal junction fibroblasts (FJDH), a sub-population of papillary fibroblasts and a sub-population of reticular fibroblasts comprising:

(a) providing a first biological sample comprising dermal fibroblasts;

(b) sampling a first portion of the first biological sample provided in step (a);

(c) measuring the level of COL11A1, UCP2, and KLF9 in the first portion of the first biological sample;

(d) determining that the first portion of the first biological samples comprises FJDH when (i) the level of COL11A1 is higher than the level of COL11A1 in a reference sample of papillary fibroblasts, (ii) the level of UCP2 is lower than the level of UCP2 in a reference sample of papillary fibroblasts, and (iii) the level of KLF9 is higher than the level of KLF9 in a reference sample of reticular fibroblasts;

(e) providing a second biological sample comprising dermal fibroblasts;

(f) sampling a first portion of the second biological sample provided in step (e);

(g) measuring the level of COL11A1 and UCP2 in the first portion of the second biological sample;

(h) determining that the first portion of the second biological sample comprises papillary fibroblasts when (i) the level of COL11A1 is lower than the level of COL11A1 in a reference sample of reticular fibroblasts and (ii) the level of UCP2 is higher than the level of UCP2 in a reference sample of reticular fibroblasts;

(i) providing a third biological sample comprising dermal fibroblasts;

(j) sampling a first portion of the third biological sample provided in step (i);

(k) measuring the level of COL11A1, UCP2, and KLF9 in the first portion of the third biological sample;

(l) determining that the first portion of the third biological sample comprises reticular fibroblasts when (i) the level of COL11A1 is higher than the level of COL11A1 in a reference sample of papillary fibroblasts, (ii) the level of UCP2 is lower than the level of UCP2 in a reference sample of papillary fibroblasts, and (iii) the level of KLF9 is lower than the level of KLF9 in a reference sample of FJDH; and (m) using a unsampled portion of the first biological sample provided in step (a), of the second biological sample provided in step (e), and of the third biological sample provided in step (i) to prepare a dermal equivalent comprising a sub-population of FJDH, a sub-population of papillary fibroblasts and a sub-population of reticular fibroblasts.

5. The method according to claim 4, further comprising measuring the level of ACAN and/or FGF9 in at least one portion of the biological sample provided in steps (a), (e) and (i).

6. The method of preparing of a dermal equivalent according to claim 4, wherein the level of the expression product of the gene in the tested sample is said to be increased when the ratio expression levels of the gene in the tested sample/reference sample is greater than or equal to 2, or the level of the expression product of the gene in the tested sample is said to be decreased when the ratio of the expression levels of the gene in the reference sample/tested sample is greater than or equal to 2.

7. A method of preparing a dermal equivalent comprising a sub-population of dermal-hypodermal junction fibroblasts (FJDH) and a sub-population of papillary fibroblasts comprising:

(a) providing a first biological sample comprising dermal fibroblasts;

(b) sampling a first portion of the first biological sample provided in step (a);

(c) measuring the level of COL11A1, UCP2, and KLF9 in the first portion of the first biological sample;

(d) determining that the first portion of the first biological sample comprises FJDH when (i) the level of COL11A1 is higher than the level of COL11A1 in a reference sample of papillary fibroblasts, (ii) the level of UCP2 is lower than the level of UCP2 in a reference sample of papillary fibroblasts, and (iii) the level of KLF9 is higher than the level of KLF9 in a reference sample of reticular fibroblasts;

(e) providing a second biological sample comprising dermal fibroblasts;

(f) sampling a first portion of the second biological sample provided in step (e);

(g) measuring the level of COL11A1 and UCP2 in the first portion of the second biological sample;

(h) determining that the first portion of the second biological sample comprises papillary fibroblasts when (i) the level of COL11A1 is lower than the level of COL11A1 in a reference sample of reticular fibroblasts and (ii) the level of UCP2 is higher than the level of UCP2 in a reference sample of reticular fibroblasts; and (i) using a unsampled portion of the first biological sample provided in step (a) and of the second biological sample provided in step (e) to prepare a dermal equivalent comprising a sub-population of FJDH and a sub-population of papillary fibroblasts.

8. The method according to claim 7, further comprising measuring the level of ACAN and/or FGF9 in at least one portion of the biological sample provided in steps (a) and (e).

9. The method of preparing of a dermal equivalent according to claim 7, wherein the level of the expression product of the gene in the tested sample is said to be increased when the ratio expression levels of the gene in the tested sample/reference sample is greater than or equal to 2, or the level of the expression product of the gene in the tested sample is said to be decreased when the ratio of the expression levels of the gene in the reference sample/tested sample is greater than or equal to 2.

10. A method of preparing a dermal equivalent comprising a sub-population of dermal-hypodermal junction fibroblasts (FJDH) and a sub-population of reticular fibroblasts comprising:
(a) providing a first biological sample comprising dermal fibroblasts;
(b) sampling a first portion of the first biological sample provided in step (a);
(c) measuring the level of COL11A1, UCP2, and KLF9 in the first portion of the first biological sample;
(d) determining that the first portion of the first biological sample comprises FJDH when (i) the level of COL11A1 is higher than the level of COL11A1 in a reference sample of papillary fibroblasts, (ii) the level of UCP2 is lower than the level of UCP2 in a reference sample of papillary fibroblasts, and (iii) the level of KLF9 is higher than the level of KLF9 in a reference sample of reticular fibroblasts;
(e) providing a second biological sample comprising dermal fibroblasts;
(f) sampling a first portion of the second biological sample provided in step (e);
(g) measuring the level of COL11A1, UCP2, and KLF9 in the first portion of the second biological sample;
(h) determining that the first portion of the second biological sample comprises reticular fibroblasts when (i) the level of COL11A1 is higher than the level of COL11A1 in a reference sample of papillary fibroblasts, (ii) the level of UCP2 is lower than the level of UCP2 in a reference sample of papillary fibroblasts, and (iii) the level of KLF9 is lower than the level of KLF9 in a reference sample of FJDH; and
(i) using a unsampled portion of the first biological sample provided in step (a) and of the second biological sample provided in step (e) to prepare a dermal equivalent comprising a sub-population of FJDH and a sub-population of reticular fibroblasts.

11. The method according to claim 10, further comprising measuring the level of ACAN and/or FGF9 in at least one portion of the biological sample provided in steps (a) and (e).

12. The method of preparing of a dermal equivalent according to claim 10, wherein the level of the expression product of the gene in the tested sample is said to be increased when the ratio expression levels of the gene in the tested sample/reference sample is greater than or equal to 2, or the level of the expression product of the gene in the tested sample is said to be decreased when the ratio of the expression levels of the gene in the reference sample/tested sample is greater than or equal to 2.

* * * * *